(12) United States Patent
Kolbus et al.

(10) Patent No.: US 10,797,909 B2
(45) Date of Patent: Oct. 6, 2020

(54) METHOD FOR TRANSMITTING DATA PACKETS BETWEEN AN ETHERNET AND A BUS SYSTEM IN A MOTOR VEHICLE, AS WELL AS GATEWAY DEVICE AND MOTOR VEHICLE

(71) Applicant: AUDI AG, Ingolstadt (DE)

(72) Inventors: Philipp Kolbus, Ingolstadt (DE); Joachim Göbel, Rimpar (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/332,922

(22) PCT Filed: Oct. 30, 2017

(86) PCT No.: PCT/EP2017/077714
§ 371 (c)(1),
(2) Date: Mar. 13, 2019

(87) PCT Pub. No.: WO2018/083049
PCT Pub. Date: May 11, 2018

(65) Prior Publication Data
US 2019/0253272 A1    Aug. 15, 2019

(30) Foreign Application Priority Data
Nov. 4, 2016  (DE) .................. 10 2016 221 690

(51) Int. Cl.
*H04L 12/40*    (2006.01)
*H04L 12/721*   (2013.01)

(52) U.S. Cl.
CPC .. *H04L 12/40091* (2013.01); *H04L 12/40169* (2013.01); *H04L 45/66* (2013.01); *H04L 2012/40215* (2013.01)

(58) Field of Classification Search
None
See application file for complete search history.

(56) References Cited

U.S. PATENT DOCUMENTS 6,654,355 B1 * 11/2003 Marbach ............. H04L 12/4135
                                                              370/285
6,728,268 B1 *  4/2004 Bird .................. H04L 29/12009
                                                              370/230

(Continued)

FOREIGN PATENT DOCUMENTS

CN    103685000 A    3/2014
CN    105812234 A    7/2016

(Continued)

OTHER PUBLICATIONS

Johanson, Mathias et al. "Relaying Controller Area Network Frames over Wireless Internetworks for Automotive Testing Applications." IEEE, Fourt International Conference on Systems and Networks Communication, 2009. (Year: 2009).*

(Continued)

*Primary Examiner* — Andrew C Oh
(74) *Attorney, Agent, or Firm* — Sterne, Kessler, Goldstein & Fox, P.L.L.C.

(57) ABSTRACT

The present disclosure relates to a method for transmitting data packets from a transmitting device to a receiving device in a motor vehicle, the data packets being transmitted via a gateway device and, for this purpose, the gateway device receiving the data packets from the transmitting device and forwarding them to the receiving device. The invention provides that the data packets of the transmitting device are each addressed to an IP address and the gateway device in the data packets respectively replaces a first packet part, by which a connection layer of an Ethernet data connection is implemented, with a corresponding packet part of the bus protocol and, in a second packet part, by which a network layer with the IP address is implemented, retains the IP address and forwards the data packets with the IP address located in the second packet part to the receiving device.

8 Claims, 2 Drawing Sheets

(56) References Cited

U.S. PATENT DOCUMENTS

| | | | |
|---|---|---|---|
| 8,301,821 B2 | 10/2012 | Ihle et al. | |
| 8,600,307 B2 | 12/2013 | Muller et al. | |
| 8,682,514 B2 | 3/2014 | Falk et al. | |
| 8,705,527 B1* | 4/2014 | Addepalli | H04L 45/12 370/389 |
| 8,826,261 B1* | 9/2014 | Anand AG | G06F 8/654 717/168 |
| 9,088,514 B2* | 7/2015 | Kim | H04L 49/555 |
| 9,154,900 B1 | 10/2015 | Addepalli et al. | |
| 9,191,467 B2* | 11/2015 | Triess | H04L 41/0893 |
| 9,215,168 B2* | 12/2015 | Kim | H04L 45/72 |
| 10,020,958 B2* | 7/2018 | Lieder | H04L 1/0002 |
| 2007/0043457 A1* | 2/2007 | Davis | H04L 67/06 700/90 |
| 2007/0185969 A1* | 8/2007 | Davis | G05B 19/4185 709/216 |
| 2007/0198144 A1* | 8/2007 | Norris | H04L 67/12 701/23 |
| 2010/0127566 A1* | 5/2010 | Biester | H04B 3/54 307/18 |
| 2010/0202355 A1* | 8/2010 | Kim | H04W 36/385 370/328 |
| 2010/0254393 A1* | 10/2010 | Steffen | H04L 12/40013 370/400 |
| 2010/0265858 A1* | 10/2010 | Gallner | H04L 12/4616 370/310 |
| 2011/0010043 A1* | 1/2011 | Lafky | B60L 53/65 701/31.4 |
| 2011/0153149 A1* | 6/2011 | Jeon | H04L 29/12849 701/29.6 |
| 2013/0166778 A1* | 6/2013 | Ishigooka | H04L 67/12 709/248 |
| 2013/0208724 A1 | 8/2013 | Colucci et al. | |
| 2014/0126584 A1* | 5/2014 | Hwang | H04L 12/413 370/466 |
| 2014/0129748 A1* | 5/2014 | Muth | G06F 13/42 710/106 |
| 2015/0094929 A1* | 4/2015 | Bell | G07C 5/008 701/99 |
| 2015/0124597 A1* | 5/2015 | Mabuchi | H04L 12/413 370/230 |
| 2015/0124839 A1* | 5/2015 | Kim | H04L 12/6418 370/467 |
| 2015/0172298 A1* | 6/2015 | Otsuka | H04L 63/1408 726/30 |
| 2015/0207772 A1* | 7/2015 | Walker | H04L 69/18 370/392 |
| 2015/0229741 A1* | 8/2015 | Kim | H04L 67/12 370/467 |
| 2015/0301976 A1* | 10/2015 | Thiele | H04L 69/22 710/313 |
| 2016/0121890 A1* | 5/2016 | Han | B60W 30/16 701/93 |
| 2016/0182341 A1 | 6/2016 | Fischer et al. | |
| 2017/0012949 A1* | 1/2017 | Boren | H04L 63/062 |
| 2017/0054574 A1* | 2/2017 | Wu | H04L 12/40013 |
| 2017/0072876 A1* | 3/2017 | Rajan | H04L 69/08 |
| 2017/0131711 A1* | 5/2017 | Thomson | G07C 5/0808 |
| 2017/0134299 A1* | 5/2017 | Park | H04L 47/6275 |
| 2017/0149243 A1* | 5/2017 | Dozier | H02J 3/14 |
| 2017/0180214 A1* | 6/2017 | Azevedo | G06N 20/00 |
| 2017/0180397 A1* | 6/2017 | Sikand | H04L 63/126 |
| 2018/0126067 A1* | 5/2018 | Ledford | A61M 5/172 |
| 2018/0205576 A1* | 7/2018 | Morita | G06F 21/64 |
| 2018/0227147 A1* | 8/2018 | Kataoka | H04L 12/40 |
| 2018/0287815 A1* | 10/2018 | Yamamoto | H04L 12/40006 |
| 2019/0268444 A1* | 8/2019 | Mardmoeller | H04L 45/741 |

FOREIGN PATENT DOCUMENTS

| | | |
|---|---|---|
| CN | 105897936 A | 8/2016 |
| DE | 102006055513 A1 | 11/2007 |
| DE | 1-02007043707 A1 | 3/2009 |
| DE | 102010026433 A1 | 1/2012 |
| DE | 102010030811 A1 | 1/2012 |
| DE | 102011010400 A1 | 8/2012 |
| DE | 102013217259 A1 | 3/2015 |
| EP | 2651088 A1 | 10/2013 |
| WO | WO-2015028342 A1 | 3/2015 |

OTHER PUBLICATIONS

International Preliminary Report on Patentability directed to related International Patent Application No. PCT/EP2017/077714, dated May 7, 2019, with attached English-language translation; 15 pages.
International Search Report and Written Opinion of the International Searching Authority directed to related International Patent Application No. PCT/EP2017/077714, dated Dec. 18, 2017, with attached English-language translation; 26 pages.
Wikipedia, Die freie Enzyklopädie: "OSI-Modell" with attached English translation, archive date Jul. 2002, available at: https://de.wikipedia.org/wiki/OSI-Modell.

* cited by examiner

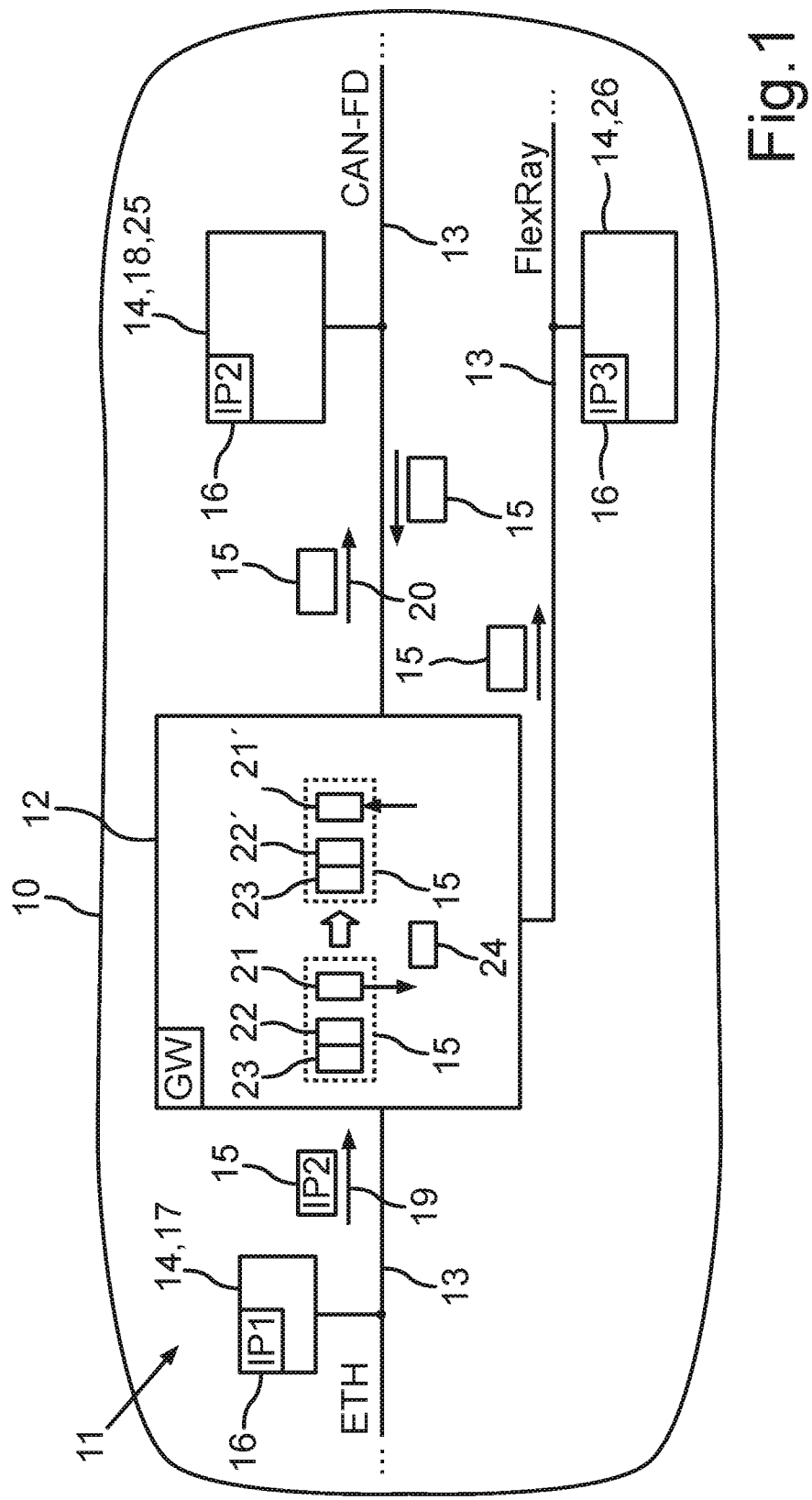

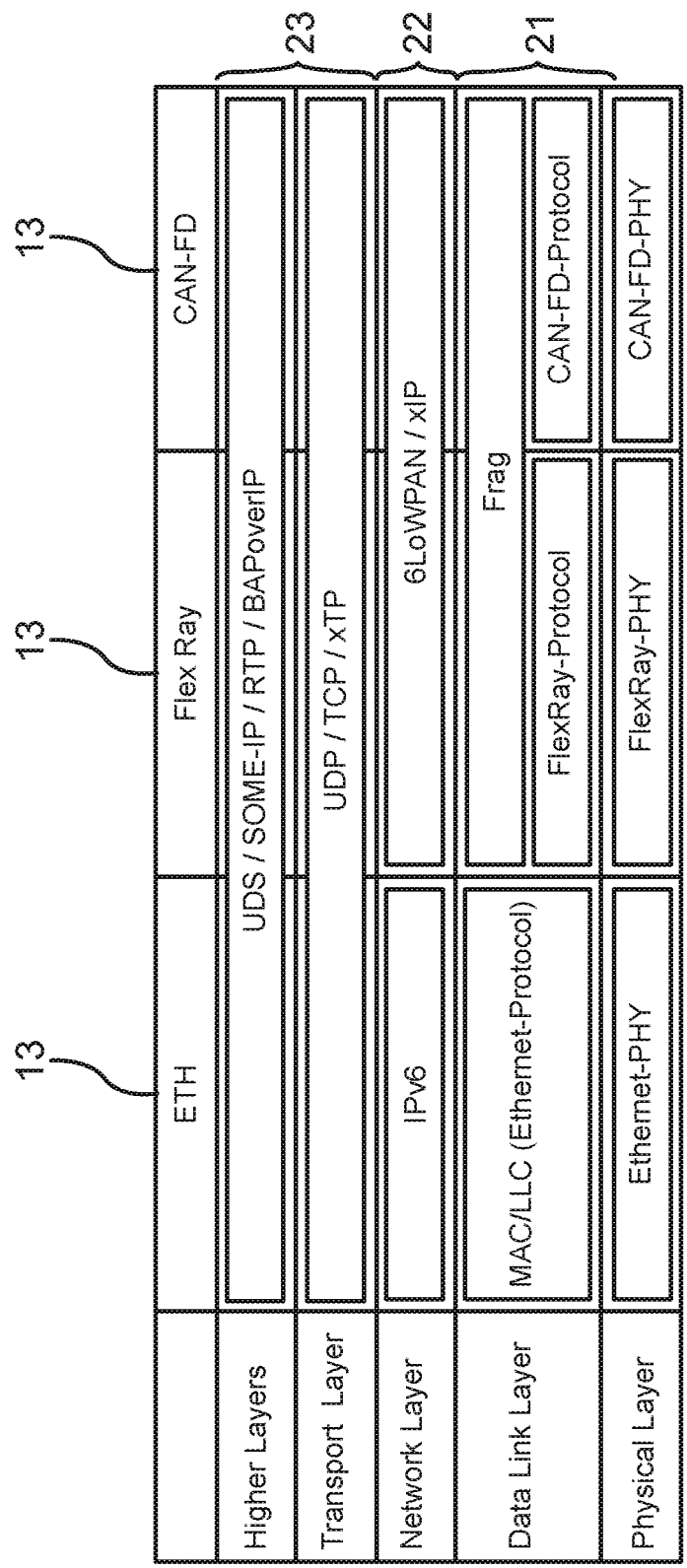

METHOD FOR TRANSMITTING DATA PACKETS BETWEEN AN ETHERNET AND A BUS SYSTEM IN A MOTOR VEHICLE, AS WELL AS GATEWAY DEVICE AND MOTOR VEHICLE

TECHNICAL FIELD

The present disclosure relates to a method for transmitting data packets between control units of a motor vehicle. For this purpose, the transmitting device and the receiving device are coupled via a gateway device. The data packets are transmitted in a hybrid data network which includes at least one Ethernet network and also at least one bus system. The present disclosure also includes the gateway device and the motor vehicle.

BACKGROUND

In a motor vehicle, data packets can be transmitted between control units via a bus system, such as a CAN (Controller Area Network) bus or FlexRay bus. Such bus systems transmit the data packets in a time slot-based manner. In addition, in a motor vehicle, a packet-oriented transmission according to the IP (Internet Protocol) can be provided by way of an Ethernet network or, for short, Ethernet. For this reason, different transport mechanisms are thus actualized. For the transmission of a data packet between the different transport mechanisms, a gateway device or, for short, a gateway can be provided, which mediates between the different transport mechanisms or transmits data between the same.

The transport mechanisms of bus systems such as CAN and FlexRay do not offer the option of providing an IP protocol (Internet Protocol) in conjunction with the associated transport layer (for example UDP (User Datagram Protocol) or TCP (Transport Control Protocol)) in the Ethernet. The IP for Ethernet offers the advantage that a unique addressing of a control unit and a flexible definition of the used transport layer (UDP/TCP) is possible and, thus, also applications or user functions of higher layers in the ISO/OSI reference model (ISO-International Organization for Standardization, OSI-Open Systems Interconnection Model) can be implemented.

Contrarily, it is provided in bus systems that a control unit always receives the data packets intended for a predetermined time slot or first has to be prepared for receiving a data packet by an identification value (CAN-ID) valid only for the local bus system.

A description of a protocol stack having a transport layer, network layer and connection layer is indicated in U.S. Pat. No. 9,154,900 B1. The use of a network layer and a connection layer for transmitting data packets in a bus system is also known from DE 10 2011 010 400 A1. Gateways are described, for example, in EP 2 651 088 A1.

The object of the present disclosure is, in a vehicle, when transmitting a data packet, to provide the transmitting device with a uniform addressing for receiving devices, regardless of whether the receiving device is reachable via an Ethernet or a bus system.

The object of the present disclosure is achieved by the subject of the independent patent claims. Advantageous further refinements of the present disclosure are described by the dependent patent claims, the subsequent description and the figures.

SUMMARY

The subject of the present disclosure is a method which in a motor vehicle enables the transmission of data packets from a transmitting device to a receiving device. The data packets are transmitted via a gateway device in the described manner. For this purpose, the gateway device receives the data packets from the transmitting device via a first data connection. The gateway device forwards the data packets to the receiving device via a second data connection. One of the data connections is guided via a first bus system on the basis of a first bus protocol. The other data connection is set up as either an Ethernet data connection on the basis of an Internet Protocol (IP) or it is guided via a second bus system on the basis of a second bus protocol. The Ethernet data connection is based in particular on IPv6. In particular, a CAN bus or a FlexRay bus can be provided as the first bus system. The CAN bus, in particular, can have the bus protocol CAN-FD. Of course, also bus systems of both bus types can be connected to the gateway device, so that the second data connection can be guided via a second bus system, which then likewise can be a CAN bus or a FlexRay bus and can differ from the first bus system. In doing so, a bus-to-bus connection based on IP addressing can then be enabled. A connection of two similar buses also can be made possible.

The data packets of the transmitting device are each addressed to an IP address. Prior to forwarding, the gateway device in the data packets replaces respectively one part of the data packet, which is designated here as the first packet part and by which a connection layer of the first data connection is implemented. Such a packet part is also referred to as protocol header. This first packet part or header is replaced with a corresponding packet part of the connection layer of the second data connection. In a second packet part, by which a network layer with the IP address is implemented, the gateway device retains the IP address. The data packets are then forwarded to the receiving device by the IP address located in the second packet part.

For example, the method may relate to the transmission in the direction from the Ethernet to a bus system. Accordingly, the gateway device thus receives the data packets from the transmitting device via an Ethernet data connection on the basis of an Internet Protocol (IP). The gateway device forwards the data packets via a bus system to the receiving device on the basis of a bus protocol. According to the method, of course, data packets also can be transmitted by bus users of the bus system in the other direction to a receiving device in the Ethernet. In this instance, the transmitting device in the bus system can also use the IP address for addressing. Also a combination of transmitting device and receiving device, both of which exclusively use a respective bus system, can be addressed on the basis of the IP address, since the respective receiving device reacts to the IP address in the described manner so that it reads in or accepts a data packet with the IP address.

The transmitting device does not have to take into account that the receiving device is located in a bus system, thus, is not located in the Ethernet network. The transmitting device nevertheless can address each of the data packets to an IP address. The gateway device then replaces respectively the first packet part in the data packets. This is because a connection layer of the Ethernet data connection is implemented by the first part of the package. Thus, this is the packet part which corresponds to the data link layer or layer 2 in the ISO/OSI reference model. This part of the packet is replaced by a corresponding packet part of the bus protocol. Thus, the first part of the packet, for example, is replaced by a CAN protocol or FlexRay protocol. The Ethernet data packet thus becomes a bus data packet.

Contrarily, a second packet part, by which the network layer with the IP address is implemented, remains at least so that the IP address is retained. The data packet is thus now a bus data packet and, for this purpose, is continuously addressed in the second part of the packet to the IP address. The data packets (with the IP address located in the second packet part) are then forwarded by the gateway device via the bus system to the receiving device.

The present disclosure advantageously results in that the transmitting device regardless of the destination device or receiving device can address or reach the receiving device respectively by an IP address, even if it is connected to a bus system. The receiving device has to check respectively only in the second packet part of a data packet whether its IP address is specified or included in order to be able to recognize whether it should or should not process the data of the data packet. Thus, in the entire motor vehicle data network, data packets can be exchanged or transmitted or addressed between control devices on the basis of an IP addressing.

Preferably, it is provided also to provide a transport layer which connects the Ethernet and the bus system, thus providing the possibility of providing so-called ports, so that a plurality of software applications within the receiving device can communicate independently from each other with a respective transmitting device. For this purpose, by the gateway device in the data packets, the user data of the transport layer are respectively addressed to the IP address and to a port of the transport layer and are received by the receiving device via a transport layer port. Such a port is also called a socket.

In the event that a unique device ID is already required in the bus system according to the bus protocol, namely the CAN protocol, this bus address must be provided in addition to the IP address in the first packet part at the level of the connection layer. For this purpose, a CAN ID of the receiving device is determined by the gateway device respectively from the IP address with the aid of a predetermined assignment rule, for example a table, and then the first packet part (connection layer) is formed on the basis of the determined CAN ID. Thus, an automatic determination of the bus ID in the bus system is made possible and that is exclusively on the basis of the IP address.

Alternatively, it can be provided that the data packets are transmitted in the bus system as broadcast data packets. For example, all bus users in the bus system (i.e. potential receiving devices) thus can check the same time slot in the bus system with regard to whether a respective data packet is transmitted to them as a broadcast data packet. The bus user who recognizes its IP address in the data packet can then as a receiving device read in or accept the data packet.

In order to generate the described data packets with an IP address for a bus system, for example, the second packet part (network layer) may be formed on the basis of the protocol 6LoWPAN, which may be adapted so to provide the described characteristics.

A problem with the transmission of data packets from an Ethernet network to a bus system may be the size or volume of data packets in accordance with the Ethernet standard. Such data packets may contain more data, i.e. be greater than a maximum permitted packet size of the bus system. Preferably, therefore, the gateway device carries out a packet fragmentation of such data packets if the data packet is greater than a predetermined maximum size. The value of the maximum size can be adapted to the maximum permissible packet size of the used bus system. As a result of the packet fragmentation, the content or the user data of the data packet is subdivided into several data packets, which are then forwarded in the bus system.

The described gateway device, that is the gateway according to the present disclosure, can be designed as a control unit, to which network branches of said network technologies (Ethernet and bus system) can be connected. The gateway device for a data network of a motor vehicle according to the present disclosure additionally has a processor device which is set up to carry out an embodiment of the method according to the present disclosure. The processor device can have at least one microprocessor and/or one microcontroller. Furthermore, a program code may be provided which is set up to carry out the embodiment of the method according to the present disclosure when executed by the processor device.

Finally, the present disclosure also provides a motor vehicle, which has a data network including at least one Ethernet and at least one bus system, the at least one Ethernet and the at least one bus system being linked via a gateway device according to the present disclosure in order to transmit data packets between the at least one Ethernet and the at least one bus system.

BRIEF DESCRIPTION OF THE DRAWINGS

Other advantages, features and details of the present disclosure result from the claims, the description of embodiments below, and the drawings, in which:

FIG. 1 depicts a schematic illustration of an example embodiment of the motor vehicle according to the present disclosure; and FIG. 2 depicts an example protocol used to transmit data packets according to example embodiments of the present disclosure.

In the example embodiments described below, the described components each represent individual features of the present disclosure to be considered independently of each other, and which also each independently further refine the present disclosure and thus also are to be regarded, individually or in a different combination than the one shown, as part of the present disclosure. Furthermore, the described embodiments can also be supplemented by further features of the present disclosure already described.

In the figures, functionally equal elements are each provided with the same reference characters.

DETAILED DESCRIPTION

FIG. 1 shows a motor vehicle 10, which may be, for example, a car, in particular a passenger car or truck. In motor vehicle 10, a data network 11 is shown, in which a plurality of network branches 13 can be linked to one another via a gateway device or, for short, a gateway 12 (GW). Different network branches 13 can be based on different transmission technologies or transport mechanisms, which is illustrated in FIG. 1 by way of example for Ethernet ETH, CAN bus CAN-FD and FlexRay bus. Control units 14 can be connected to network branches 13, which can exchange or transmit data packets 15 having data, for example sensor data or control data or status data, via data network 11. In this case, control units 14 can specify the respective addressee or receiver for each data packet 15 by way of an IP address 16. In other words, each control unit 14 is identified by an IP address 16 (IP1, IP2, IP3) in data network 11, although data branches 13 may also be based on a transport mechanism for a bus system, as is illustrated for data branches 13 in accordance with CAN-FD and FlexRay in FIG. 1.

It is thus possible, for example, that a control unit 14 of the Ethernet as transmitting device 17 transmits a data packet 15, which is addressed to a control device 14, for example in the CAN bus, so that this CAN control device 14 constitutes a receiving device 18.

Gateway 12 enables that, via network branch 13 of Ethernet ETH, data packet 15, which has the IP address 16 of the receiving device 18 (in the example: IP2), is received via an Ethernet data connection 19 and is processed such that it can be forwarded via network branch 13 in accordance with bus protocol 20 (for example CAN-FD) of network branch 13 of receiving device 18.

In this case, a data packet 15 can have a packet part 21 for the connection layer, a packet part 22 for the network layer and a packet part 23 having further user data. In this instance, packet part 21 is specific to the used transport mechanism (ETH, CAN, FlexRay). This packet part can be exchanged by gateway 12 for forwarding. If, for example, a CAN ID for forwarding in the bus system is necessary, this CAN ID can be determined based on the IP address of data packet 15 from a table 24, which thus represents an assignment rule within the context of the present disclosure. Thus, in received data packet 15, packet part 21 can be removed and replaced by a bus-compliant packet part 21'. Packet part 22 with the IP address can be retained or replaced by a modified packet part 22', which however can also retain the IP addressing with the IP address. For example, a modified packet part 22' may be formed for transmission in a bus system on the basis of protocol 6LoWPAN. User data 23 can be retained.

FIG. 2 illustrates this for network branches 13 based on the ISO/OSI reference model on the basis of the resulting protocol structure. "Higher layers" here refer to the application part, i.e. the software applications, by which respective functionalities of control units 14 are implemented or provided. The transport layer of packet part 23 including the user data can remain unchanged (continuous layers). However, a fragmentation Frag can be provided for user data 23.

One does not have to be built on an existing protocol in order to use IP address 16 in the bus systems. One can also use a self-developed xIP protocol. To provide a transport layer, known protocols (UDP/TCP) or an also self-developed protocol xTP can be used.

With the aid of the protocol structure, also a control device 14 of a bus system as transmitting device 25 can transmit data packets 15 to an Ethernet control unit or to a receiving device 26 in another bus system or even in the same bus system on the basis of addressing with the aid of IP address 16. In this case, packet part 21 (data link layer) according to FIG. 2 can then likewise be adapted to the destination bus system.

Thus, bus protocols can be standardized with regard to Ethernet and thus data packets can flexibly be transmitted or replaced in motor vehicle 10. As a result, the CAN-FD and FlexRay bus systems become compatible with Ethernet, resulting in a uniform transport mechanism for control units 14. Gateway 12 thus provides routing mechanisms which are uniform for bus systems and Ethernet. Routing tables for managing or determining destination network branch 13 are based on end-to-end addressing, i.e. the IP address. FIG. 2 illustrates that the data parts or packet parts of data packets 15 can be divided into packet parts 21, 22, 23 and be treated separately from one another and, in doing so, be replaced in the manner described in order to be able to forward a data packet 15 between different network branches 13.

The implementation of a uniform network protocol on the basis of IP addresses results in a uniform network layer for bus systems CAN-FD and FlexRay and for an Ethernet. In particular, it is provided in this instance to use protocol variant IPv6, which continuously can be used independently in the Ethernet. Since this protocol having 40 bytes entails too much overhead, for example, CAN-FD (maximum 64 bytes total packet size), a compressed version of IPv6 here can be provided. This can be done, for example, on the basis of 6LoWPAN, which enables such compression. Furthermore, fragmentation Frag below the network layer according to FIG. 2 can be provided in order to be able to implement the IPv6-required MTU (maximum transfer unit) of 1280 bytes. The fragmentation as provided by 6LoW-PAN, however, in this case is not suitable for CAN-FD or FlexRay. Therefore, fragmentation Frag is provided in connection layer 21. Above the network layer, for the processing of user data 23, any transport protocol across buses can logically connect control units 14 of all network branches 13.

The example shows how the present disclosure can provide a transporting mechanism across buses on the basis of IPv6.

What is claimed is:

1. A method for transmitting data packets from a transmitting device to a receiving device in a motor vehicle, the method comprising:

transmitting, by the transmitting device, data packets to a gateway device in the motor vehicle via a first data connection, wherein the data packets are addressed to an Internet Protocol (IP) address;

receiving, by the gateway device, the data packets via the first data connection;

determining, by the gateway device, a CAN identification of the receiving device based on the IP address and using a predetermined assignment rule;

removing, by the gateway device, a first packet part of each data packet, wherein the first packet part comprises a portion of the data packet used to implement a data link layer of the first data connection, and wherein the IP address is retained in a second packet part, the second packet part comprising a portion of the data packet used to implement a network layer with the IP address;

replacing in each data packet, by the gateway device, the removed first packet part with a corresponding replacement packet part of a data link layer of a second data connection based at least in part on the determined CAN identification, wherein the replacement packet part comprises a portion of the data packet used to implement the data link layer of the second data connection; and forwarding, by the gateway device, the data packets to the receiving device via the second data connection;

wherein the first data connection is an Ethernet data connection based on IP, or is guided via a first bus system based on a first bus protocol, the first bus system comprising a FlexRay bus, and wherein the second data connection is guided via a second bus system based on a second bus protocol, the second bus system comprising a CAN-FD bus.

2. The method as recited in claim 1, wherein the first bus protocol is a FlexRay protocol and the second bus protocol is a CAN protocol.

3. The method as recited in claim 1, wherein each data packet comprises user data of a transport layer addressed to the IP address and a port of the transport layer,
and wherein the method further comprises receiving, by the receiving device, the data packets via a port of the transport layer.

4. The method as recited in claim 1, wherein forwarding the data packets comprises transmitting the data packets as broadcast data packets via the second bus system.

5. The method as recited in claim 1, further comprising transforming each second packet part in accordance with a 6LoWPAN protocol for transmission in the second bus system.

6. The method as recited in claim 1, further comprising performing, by the gateway device, a packet fragmentation of one or more of the data packets that are larger than a predetermined maximum size.

7. A gateway device for a data network of a motor vehicle, wherein the gateway device has a processor device configured to perform operations comprising:
receiving data packets from a transmitting device in the motor vehicle via a first data connection, wherein the data packets are addressed to an Internet Protocol (IP) address;
determining a CAN identification of a receiving device of the data packets based on the IP address and using a predetermined assignment rule;
removing a first packet part of each data packet, wherein the first packet part comprises a portion of the data packet used to implement a data link layer of the first data connection, and wherein the IP address is retained in a second packet part, the second packet part comprising a portion of the data packet used to implement a network layer with the IP address;
replacing, in each data packet, the removed first packet part with a corresponding replacement packet part of a data link layer of a second data connection based at least in part on the determined CAN identification, wherein the replacement packet part comprises a portion of the data packet used to implement the data link layer of the second data connection; and
forwarding the data packets to the receiving device via the second data connection;
wherein the first data connection is an Ethernet data connection based on IP, or is guided via a first bus system based on a first bus protocol, the first bus system comprising a FlexRay bus, and wherein the second data connection is guided via a second bus system based on a second bus protocol, the second bus system comprising a CAN-FD bus.

8. A motor vehicle having a gateway device, wherein the gateway device has a processor device configured to perform operations comprising:
receiving data packets from a transmitting device in the motor vehicle via a first data connection, wherein the data packets are addressed to an Internet Protocol (IP) address;
determining a CAN identification of a receiving device of the data packets based on the IP address and using a predetermined assignment rule;
removing a first packet part of each data packet, wherein the first packet part comprises a portion of the data packet used to implement a data link layer of the first data connection, and wherein the IP address is retained in a second packet part, the second packet part comprising a portion of the data packet used to implement a network layer with the IP address;
replacing, in each data packet, the removed first packet part with a corresponding replacement packet part of a data link layer of a second data connection based at least in part on the determined CAN identification, wherein the replacement packet part comprises a portion of the data packet used to implement the data link layer of the second data connection; and
forwarding the data packets to the receiving device via the second data connection;
wherein the first data connection is an Ethernet data connection based on IP, or is guided via a first bus system based on a first bus protocol, the first bus system comprising a FlexRay bus, and wherein the second data connection is guided via a second bus system based on a second bus protocol, the second bus system comprising a CAN-FD bus.

* * * * *